United States Patent [19]

Johansson

[11] Patent Number: 4,666,363
[45] Date of Patent: May 19, 1987

[54] MANIPULATOR FOR COOPERATION WITH AN INDUSTRIAL ROBOT

[75] Inventor: John I. E. Johansson, Torsas, Sweden

[73] Assignee: Hobart Brothers Company, Troy, Ohio

[21] Appl. No.: 721,623

[22] Filed: Apr. 10, 1985

[30] Foreign Application Priority Data

Apr. 16, 1984 [SE] Sweden .................................. 8402122

[51] Int. Cl.$^4$ .............................................. B66C 13/00
[52] U.S. Cl. ..................................... 414/736; 198/378; 269/71; 901/6
[58] Field of Search ............... 414/222, 225, 729, 730, 414/736, 738, 680; 901/6, 7, 8, 41, 42, 43; 198/378, 379, 344, 474.1; 269/63, 67–71

[56] References Cited

U.S. PATENT DOCUMENTS 4,014,495 3/1977 Oda et al. ..................... 901/42 X
4,406,576 9/1983 Inaba et al. ..................... 414/735

FOREIGN PATENT DOCUMENTS 2849126 6/1979 Fed. Rep. of Germany ...... 198/378

Primary Examiner—Robert J. Spar
Assistant Examiner—Donald W. Underwood
Attorney, Agent, or Firm—Biebel, French & Nauman

[57] ABSTRACT

A manipulator for positioning a series of workpieces relative to a robot. The manipulator contains at least two separate fixture supports. The fixture supports are alternately transferred between a loading position and an operative position adjacent the robot by a transfer motor. The fixture supports are rotated by a single turning motor which is alternately placed into engagement with each fixture only when that fixture in the operative position.

10 Claims, 7 Drawing Figures

MANIPULATOR FOR COOPERATION WITH AN INDUSTRIAL ROBOT

BACKGROUND OF THE INVENTION

This invention is concerned with a manipulator for positioning a series of workpieces relative to an industrial robot by means of which the workpieces, one after the other, are to be processed, said manipulator comprising at least two separate fixture supports transferable between a loading position, in which exchange of workpieces in fixtures carried by the fixture supports may take place also during the operation of the robot, and an operative position, in which the workpiece mounted in the respective fixture support is held within the operating range of the robot and is rotatable about an axis, the position of which relative to the robot is predetermined, such transfer being effected by means of a turning motor which is co-ordinated with the operational movements of the robot through a control system in order to render various surface portions and parts of the workpiece accessible to an implement handled by the robot. This implement may for example be a welding gun, by means of which parts incorporated in a workpiece are to be welded together, or a spray gun, by means of which a workpiece is to be surface treated.

Manipulators of the kind just defined, which have been known for a long time, offer many advantages such as that the robot does not need to be moved during its operation and may be utilized to an optimum extent. However, they also have certain drawbacks, namely a fairly complex construction and, hence, they are expensive to manufacture. One of the reasons for this is that in the manipulators so far known the various fixture supports have always been provided with their own separate turning motors. These turning motors, which under the influence of remote control signals must be capable of changing the angular positions of the fixture supports relative to the robot with high accuracy, are in themselves expensive and require in addition fairly complex electrical coupling arrangements in order to be alternately co-ordinated with the robot. In the known manipulators there was also a need for special means for keeping the fixture supports in correct working position during the operation of the robot, and the handling of elongate workpieces frequently presented considerable difficulties.

SUMMARY OF THE INVENTION

The aim of the present invention is to provide a manipulator of the kind defined in the introduction which is considerably less expensive and easier to manufacture than are the ones hitherto known, but which nevertheless is capable of satisfying all reasonable functional demands and, in addition, gives improved possibilities for handling elongate workpieces.

The main feature of the manipulator according to the invention is the use of a single turning motor common to all the fixture supports, and means for alternately placing said motor into driving engagement with each one of the fixture supports only when said fixture support has been transferred to the operative position.

Other objects and advantages of the invention will be apparent from the following description, the accompanying drawings and the appended claims.

DETAILED DESCRIPTION OF THE INVENTION

Figure 1:
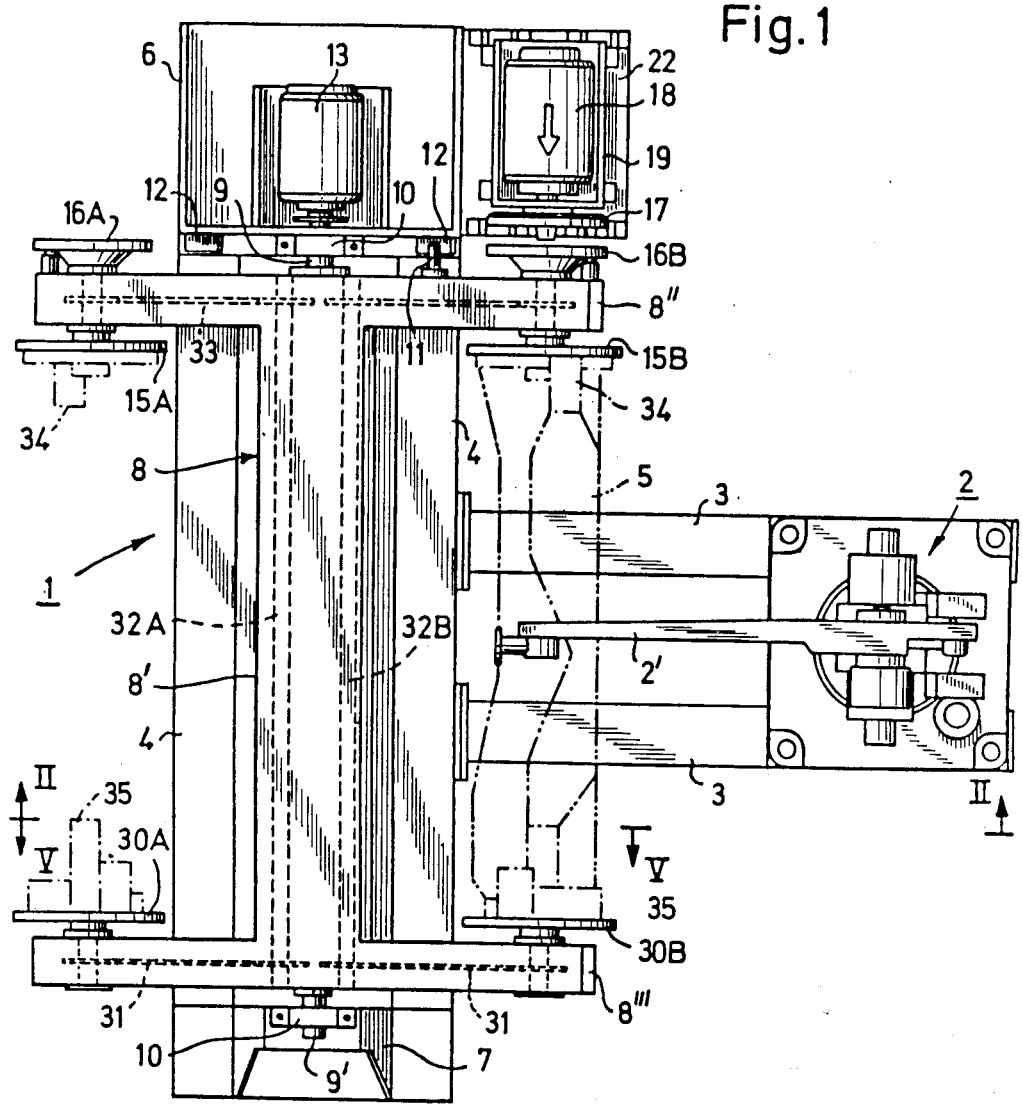
FIG. 1 is a plan view of a manipulator with an associated industrial robot.

In FIG. 1, numeral 1 designates in general a manipulator according to the invention which cooperates with an industrial robot 2 which is stationarily located in relation to the manipulator 1 by the fact that its base is through base beams 3 connected to corresponding base beams 4 of the manipulator 1. The industrial robot 2 is of the type having an implement supporting arm 2' which may be swung horizontally as well as vertically and, in addition, may be moved in its longitudinal direction to wield an implement, not shown, over a workpiece 5 supported by the manipulator and indicated by dash-and-dot lines. The detailed design of the industrial robot 2 is irrelevant to the invention, but it should be clear that the same in known manner is adapted to operate according to a predetermined program accommodated to the workpiece at hand, said program also including control of the manipulator.

The manipulator 1 comprises a main stand 6 and a secondary stand 7 secured to opposite ends of the base beams 4 and supporting between them a generally H-shaped holder 8, which is rotatable about a horizontal main axis represented by pivots 9 and 9' journalled in bearings 10 supported by the stands 6 and 7. The holder 8 has a tubular central portion 8' extending parallel to the main axis of the holder, and a pair of likewise tubular transversely extending arms 8" and 8"', respectively, which are arranged at the respective ends of the central portion and project in opposite directions therefrom. On the side of the arm 8" facing the main stand 6 there projects a pin 11 which is adapted to cooperate with stops 12 mounted on the side of the main stand 6 facing the holder for limiting the rotational movement of the holder 8. A reversible electric motor 13 supported by the main stand 6 and the operation of which in a suitable manner is co-ordinated with the operational program of the robot 2 serves through a sliding clutch 14 to rotate the holder 8 to and fro approximately 180° about the main axis 9–9' such that the pin 11 is caused to alternatingly abut against the one or the other of the two stops 12.

In the vicinity of their respective ends of the holder arm 8" two first fixture supporting plates 15A and 15B are rotatably mounted at equal distances from the main axis 9–9' of the holder, and this in such a manner that the axes of rotation of the two fixture supporting plates 15A and 15B are parallel to said main axis and like the same extend horizontally. The fixture supporting plates 15A and 15B are arranged on the inside of the holder arm 8"

turned away from the main stand 6, and through a related shaft each fixture supporting plate is non-rotatably secured to a corresponding clutch plate 16A and 16B, respectively, which is located on the outside of the arm 8″ facing the main stand 6.

Figure 4:
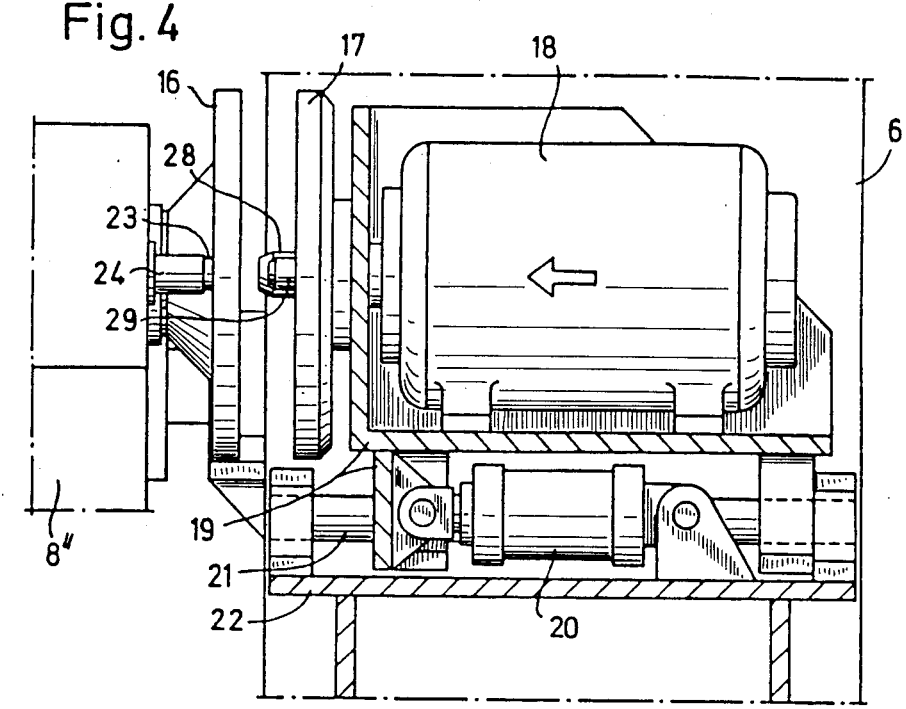
FIG. 4 is a partial side view, partly in section, and seen from the line IV—IV in FIG. 2.
Figure 5:
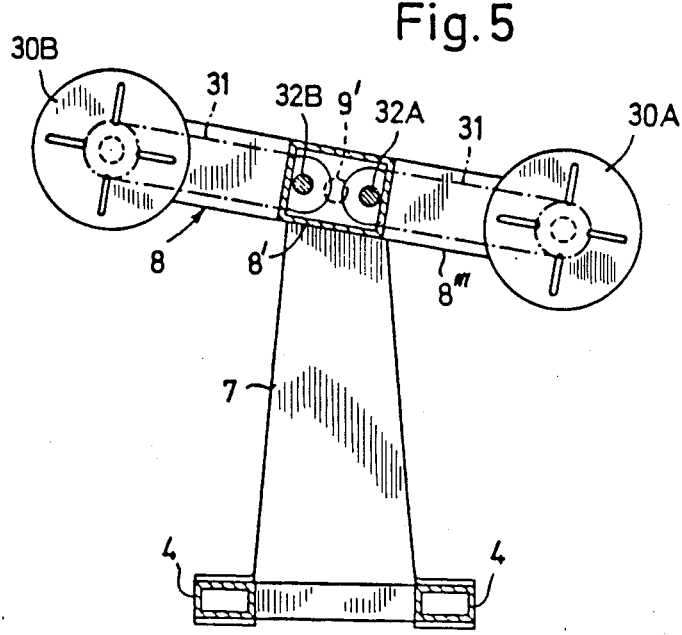
FIG. 5 is a section as seen from the line V—V in FIG. 1.

A drive plate 17 is adapted to engage one of the two clutch plates 16A and 16B at a time. The drive plate 17 is secured on the shaft of a turning motor 18, the rotational movements of which through a known, but not shown, electrical control system are co-ordinated with the operational movements of the robot 2. The turning motor 18 may, of course, be permanently connected to the control system of the robot as it is common to both the two fixture supporting plates 15A and 15B. The turning motor 18 is fastened on a slide 19 which under the actuation of a moving mechanism 20—represented in the example shown by a double-acting pneumatic cylinder, see FIG. 4—is movable in the axial direction of the turning motor along a rectilinear guide 21 which is mounted on a shelf 22 mounted on one side of the main stand 6.

Figure 6:
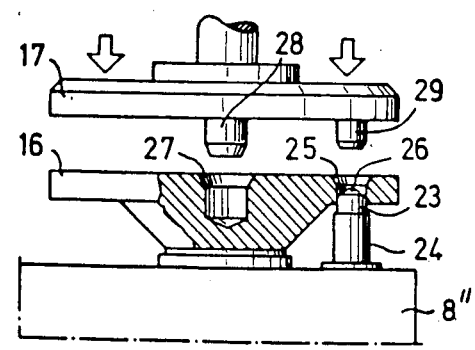
FIG. 6 is a detail view, partly in section, of the clutch between the turning motor and the fixture support showing the clutch members disengaged.
Figure 2:
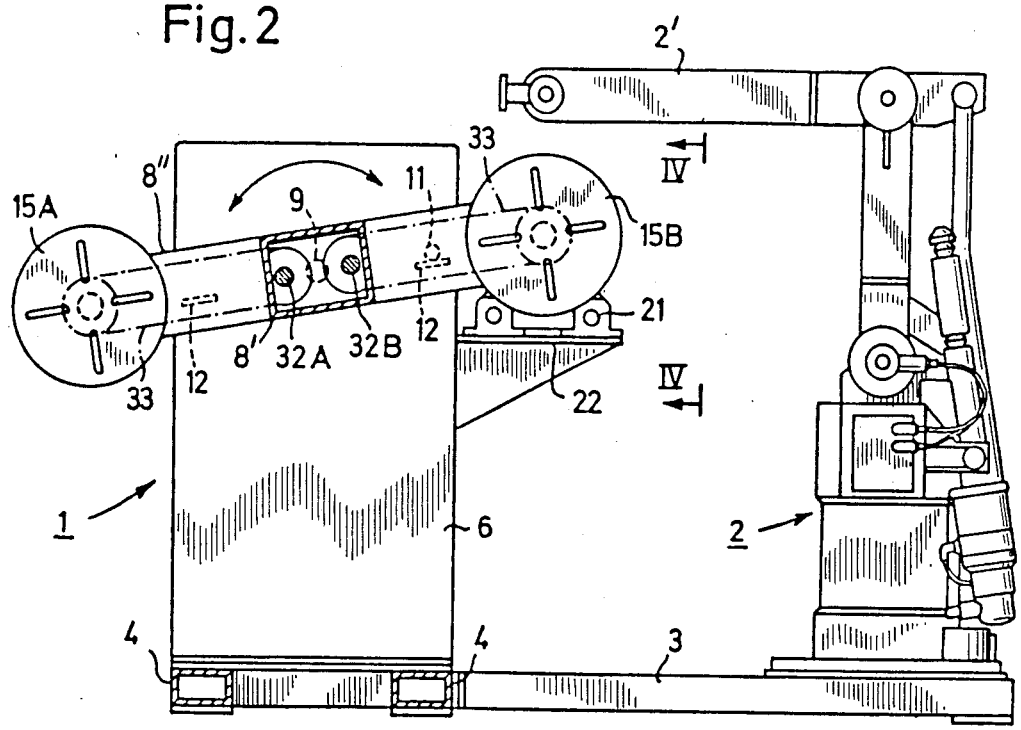
FIG. 2 is a section taken along the line II—II in FIG. 1.
Figure 3:
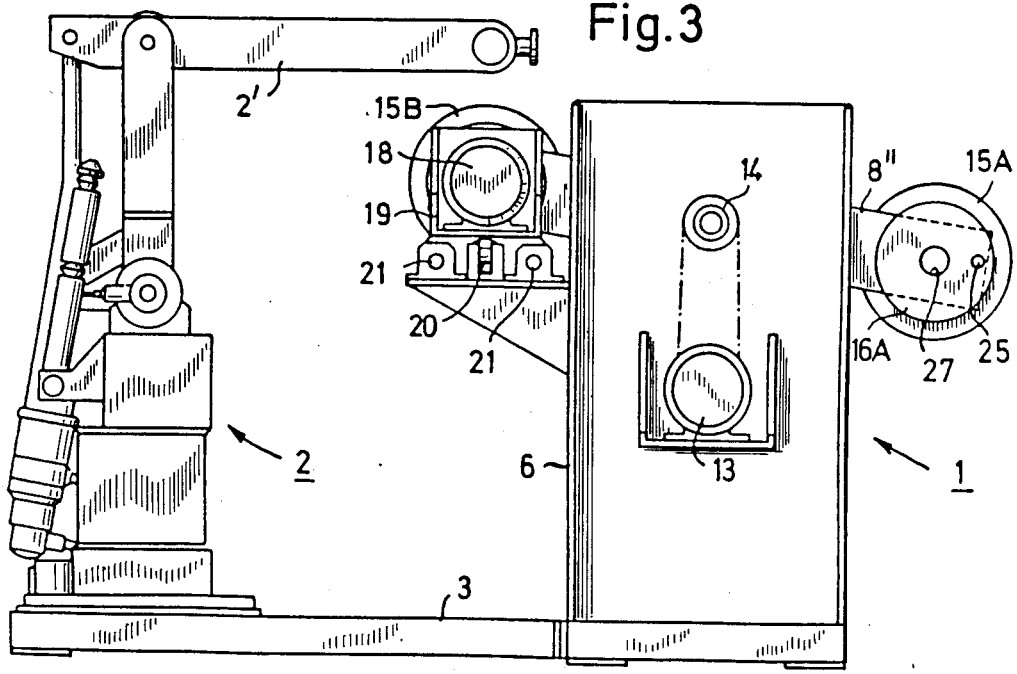
FIG. 3 is an end view of the manipulator and the robot as seen from the upper end of FIG. 1.

The drive plate 17 driven by the turning motor 18 serves as a first, movable clutch member which by the movement of the side 19 may be made to engage and disengage the clutch plate 16A or 16B which for the time being is generally in line with the axis of the turning motor 18. Such movement of the slide 19 is then presumed to take place only when the rotor of the turning motor 18 and hence also the drive plate 17 occupy a certain given starting angular position corresponding to a certain angular position of the clutch plate relative to the holder 8. In this position each clutch plate 16A and 16B, respectively, is fixed by means of a locking pin 23 (FIG. 6) which from a guiding sleeve 24 attached to the holder arm 8 projects into a bore 25 provided in the clutch plate and eccentrically located therein, the locking pin having a running ball 26 in its end.

Figure 7:
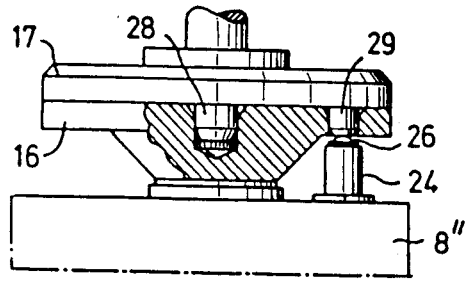
FIG. 7 is a corresponding detail view showing the clutch members in mutually engaged position.

In addition each clutch plate 16A and 16B, respectively, has a central hole 27 which is at least partly conical in shape and which is adapted to receive a likewise partially conical central pin 28 on the drive plate 17, the task of which is to accurately center the clutch plate relative to the turning motor 18 and thus determine the accurate position for the axis of rotation about which the workpiece 5 will be turned by means of the turning motor 18 during the operation of the industrial robot 2. This means that no high demands on accuracy are made on the swinging movements which the motor 13 imparts to the holder 8. The drive plate 17 is further provided with an eccentrically arranged drive pin 29 which, when the clutch members are engaged, enters the bore 25 and in doing so pushes away the locking pin 23, as shown in FIG. 7, such that the two engaged clutch members 16 and 17 may be freely rotated by means of the turning motor 18. When such rotation takes place the running ball 26 of the locking pin 23 rolls against the back of the clutch plate, i.e., its bottom side in FIG. 7, under the actuation of a moderate spring pressure.

In the vicinity of their respective ends of the other holder arm 8‴ two second fixture supporting plates 30A and 30B are rotatably mounted which face and are journalled coaxially with each one of the two fixture supporting plates 15A and 15B, respectively. Each such second fixture supporting plate 30A and 30B, respectively, is through a chain transmission 31 housed within the holder arm 8‴ connected to an auxiliary shaft 32A and 32B, respectively, rotatably mounted in the central portion 8′ of the holder 8 and being through a second chain transmission 33 housed in the holder arm 8″ connected to the corresponding first fixture supporting plate 15A and 15B, respectively. This connection between each pair of opposite fixture supporting plates 15A and 30A as well as 15B and 30B is permanent and assures that the two plates in each pair will be synchronously turned under the actuation of the turning motor 18 such that they may between them support parts of a common workpiece which for example are to be welded together by means of the robot 2. The two auxiliary shafts 32A and 32B are parallel with the main axis 9, 9′ of the holder 8.

The fixture supporting plate 15 and 30 are in a manner known per se designed to permit the attachment of suitable fixtures—indicated in dash-and-dot lines at 34 and 35, respectively, in FIG. 1—for retaining the workpieces or the parts to be included therein and to be, for example, welded together. Of course, when needed, fixtures on the two opposite fixture supporting plates 15 and 30, respectively, may also be used for supporting individual workpieces, if this would be desirable in a certain case.

The mode of operation of the manipulator is as follows: After a new workpiece or parts of the same have been fastened between the fixture supporting plates 15A and 30A which are assumed to be in the left hand position as shown in FIG. 1, the so-called loading position, the holder 8 is by means of the motor 13 rotated half a revolution such that the workpiece is moved to the so-called operative position within the operating range of the robot 2, which may in certain cases necessitate the folding up of the implement suporting arm 2′ of the robot. Thereafter the moving mechanism 20 of the slide 19 is activated such that the turning motor 18 is axially moved in the downward direction in FIG. 1 and the drive plate 17 is moved into engagement with the clutch plate 16A of the fixture support in the first place to center the same and then to drivingly engage it by the fact that the eccentric pin 29 enters the bore 25 and at the same time pushes out the locking pin 23. Now the industrial robot 2 may carry out its operation in co-ordination with the turning motor 18 which sees to it that desired portions of the workpiece become accessible to the implement of the robot. During the time the robot is in operation a new workpiece is mounted between the two other fixture supporting plates 15B and 30B of the holder 8.

When the operation of the robot on the first workpiece is finished, the moving mechanism 20 is again activated, but in the opposite direction as compared with before in order to make the drive plate 17 disengage the clutch plate 16A. This takes place in exactly the same angular position as the engagement of the clutch which means that the clutch plate 16A is again locked by its associated locking pin 23. When the clutch members have been disengaged the holder 8 is again rotated approximately half a revolution by means of the motor 13 but this time in the opposite direction as compared with before, the newly mounted workpiece being thus moved into the operative position within the operating range of the robot whereas the completed workpiece is moved to the loading position and may be detached in order to be replaced by a further new workpiece.

It should be clear that in the foregoing the invention has been described with reference to partly diagrammatic and simplified illustrations. Hence, in practice many modifications as to details of the construction may be resorted to within the scope of the following claims. Thus, for example, the cooperating clutch members, i.e., the clutch plates 16 and the drive plate 17 may with unaltered basic operation be given another detail design. Further the two auxiliary shafts 32A and 32B may, of course, be concentric, one tubularly surrounding the other. Likewise the guide and the moving mechanism of the turning motor 18 may be designed in various different ways.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a manipulator for positioning a series of elongated workpieces relative to an industrial robot (2) by means of which the workpieces (5), one after the other, are to be processed, said manipulator comprising at least two separate fixture supports (15A; 15B) transferable between a loading position, in which an exchange of workpieces in fixtures (34) carried by the fixture supports may take place during the operation of the robot, and an operative position, in which the workpiece mounted in the respective fixture support is held within the operating range of the robot and is rotatable about an axis, the position of which relative to to robot is predetermined, such transfer and rotation being effected by means of a transfer motor (13) and turning motor (18) which is adapted to drive the fixture support and the operation of which is coordinated with the operational movements of the robot through a control system in order to render various surface portions and parts of the workpiece accessible to an implement handled by the robot, the improvement comprising a single turning motor (18) common to all the fixture supports (15A; 15B), means for alternately placing said motor into driving engagement with each one of the fixture supports only when said fixture support has been transferred to the operative position, means for supporting the end of the elongate workpiece in coaxial relation to and opposite the fixture supports, said means including a pair of second fixture support plates (30A and 30B), and means for drivingly connecting said second fixture support plates to its respective fixture support.

2. The manipulator of claim 1 including a first clutch member (17) driven by said turning motor (18) and axially movable to engage and disengage a cooperating second clutch member (16A; 16B) secured to each one of said fixture supports (15A; 15B).

3. The manipulator of claim 2 wherein the first clutch member (17) is secured to the shaft of the turning motor (18), and wherein the turning motor is axially movable along a stationary guide (21) under the actuation of a moving mechanism (2) in order to cause the first clutch member to engage and disengage the second clutch member (16A; 16B) secured to the respective fixture support (15A; 15B).

4. The manipulator of claim 2 wherein said transfer motor (13) provides means for adjusting and positioning the axis of rotation of said fixture support relative to the robot (2).

5. The manipulator of claim 2 further including means for causing said clutch member (17) to engage the second clutch member (16A; 16B) of the respective fixture support (15A; 15B) only in a single, predetermined mutual angular position between the two clutch members.

6. The manipulator according to claim 5 including a common holder (8) for rotatably supporting each individual fixture support (15A; 15B) for transfer between a loading position and an operative position, said holder being rotatable relative to a stand (6) supporting the holder and the turning motor (18) about a main axis (9, 9') which is parallel to the axes of rotation of the respective fixture supports and centrally located relative to them, and a releasable locking device (23) for locking each fixture support in a predetermined angular position relative to the holder.

7. The manipulator of claim 6 wherein the main axis (9, 9') of the holder (8) and the axes of rotation of the fixture supports (15A; 15B) are horizontal.

8. The manipulator according to claim 6 including means for releasing said locking device (23) associated with each fixture support (15A; 15B) upon the engagement of the first clutch member (17) with the second clutch member (16A; 16B) of the fixture support.

9. The manipulator of claim 6 wherein said holder (8) includes two fixture supports (15A; 15B) said manipulator further including a reversible driving motor (13) for transferring the fixture supports between the loading position and the operative position located approximately 180° about the axis (9, 9') of said support.

10. The manipulator of claim 1 wherein each of said second fixture support plates is interconnected to its respective fixture supports by means of a common auxiliary shaft which is parallel to but offset in relation to the axes of rotation of the fixture supports.

* * * * *